United States Patent [19]
Ohtake et al.

[11] Patent Number: 5,074,374
[45] Date of Patent: Dec. 24, 1991

[54] POWER UNIT SUPPORTING APPARATUS FOR AUTOMOBILE

[75] Inventors: Shuji Ohtake; Takanao Uchida; Katsunori Mori, all of Saitama, Japan

[73] Assignee: Honda Giken Kogyo Kabushiki Kaisha, Tokyo, Japan

[21] Appl. No.: 561,634

[22] Filed: Aug. 2, 1990

[30] Foreign Application Priority Data

Aug. 8, 1989 [JP] Japan .................................. 1-205068

[51] Int. Cl.⁵ ............................................ B62D 21/00
[52] U.S. Cl. ..................................... 180/312; 180/300; 280/716
[58] Field of Search ............... 180/312, 299, 291, 300; 280/716 X

[56] References Cited

U.S. PATENT DOCUMENTS

| 2,084,080 | 6/1937 | D'Aubarede | 180/300 |
| 4,420,060 | 12/1983 | Kakimoto | 180/300 |
| 4,667,764 | 5/1987 | Sawada et al. | 180/312 |

FOREIGN PATENT DOCUMENTS

| 0225347 | 12/1924 | United Kingdom . |
| 0407974 | 3/1934 | United Kingdom . |
| 0598754 | 2/1948 | United Kingdom . |
| 0981853 | 1/1965 | United Kingdom . |
| 1206335 | 9/1970 | United Kingdom . |

Primary Examiner—Kenneth R. Rice
Assistant Examiner—Paul Dickson
Attorney, Agent, or Firm—Armstrong, Nikaido, Marmelstein, Kubovcik & Murray

[57] ABSTRACT

A power unit supporting apparatus for an automobile for supporting on a vehicle body a power unit including an engine portion having a crankshaft directed in a longitudinal direction of the vehicle body and a drive shaft extended in a lateral direction of the vehicle body for driving wheels, and further including a first elastic support device for elastically supporting on the vehicle body a first end of the power unit which is far from a compartment, a second elastic support device for elastically supporting on the vehicle body that intermediate portion of the power unit which sandwiches the center of gravity of the power unit between the first end and the intermediate portion of the power unit, and a displacement defining device provided between the second end of the power unit close to the vehicle room and the vehicle body to resiliently restrain a vertical displacement of the second end in an amount more than a predetermined level, wherein the spring constants of the first and second elastic support devices are set to be relatively large in the vertical direction of the power unit and relatively small in a rolling direction of the power unit. The rolling vibration of the power unit is effectively absorbed during idling and the pitching amplitude of the power unit is effectively restrained during load operation to exhibit a reliable proof against floating up of the power unit.

14 Claims, 8 Drawing Sheets

FIG.9

POWER UNIT SUPPORTING APPARATUS FOR AUTOMOBILE

BACKGROUND OF THE INVENTION

1. Field of the Invention

The field of the present invention is a power unit supporting apparatus for an automobile for supporting a power unit on a vehicle body comprising an engine portion in which a crankshaft is arranged in a longitudinal direction of the vehicle body, a transmission portion provided on one end of the engine portion in a longitudinal direction of the vehicle body, and a drive shaft disposed below the engine portion and extended in a lateral direction of the vehicle body for driving wheels.

2. Description of the Prior Art

In the past, in the power unit supporting apparatus of this kind, a power unit is supported at front and rear ends thereof on a vehicle body by respective elastic support means (see Japanese Utility Model Application Laid-Open No. 61225/86).

However, the power unit of the type in which an engine portion having a crankshaft arranged in a longitudinal direction of the vehicle body is provided at one end of the engine portion with a transmission portion is lengthy in the longitudinal direction of the vehicle body. Therefore, there is a problem that when the power unit is supported at both front and rear ends thereof on the vehicle body as mentioned above, one support portion comes very close to a compartment of a vehicle, and as a result, a vibration of the power unit is transmitted to the compartment during operation so as to adversely affect the comfortableness of the compartment.

SUMMARY THE INVENTION

The present invention has been accomplished under these circumstances. An object of the invention is to provide a power unit supporting apparatus of the mentioned type which can restrain the transmission of the vibration of the power unit to the compartment and which can fulfill both absorb vibration during idling and serve as proof against floating up of the power unit during load-operation.

For achieving the aforesaid object, the apparatus according to the present invention comprises first elastic support means for elastically supporting on a vehicle body that one end of a power unit which is far from a compartment of a vehicle, second elastic support means for elastically supporting on the vehicle body that intermediate portion of the power unit which sandwiches the center of gravity of the power unit between said one end and said intermediate portion of the power unit, and displacement defining means provided between the other end of the power unit close to the compartment and the vehicle body to resiliently restrain a vertical displacement of said the other end in excess of a predetermined amount, wherein spring constants of the first and second elastic support means are set to be relatively large in a vertical direction of the power unit and relatively small in a rolling direction thereof.

According to the above-described arrangement, even if the power unit vibrates in the rolling direction during idling, the first and second elastic support means exhibit the characteristic of the small spring constant to well absorb the vibration whereas the displacement defining means freely allows the vibration of the power unit to effectively cutoff the transmission of vibration from the power unit to the vehicle body. Particularly, it is possible to prevent the vibration of the power unit from being transmitted to the compartment through the displacement defining means.

Furthermore, even if the power unit vibrates in the pitching direction during load-operation, the first and second elastic support means exhibit the characteristic of the large spring constant and effectively prevent the power unit from floating up so that the amplitude of the power unit can be restrained to a small level. If the amplitude exceeds a certain value, the displacement defining means is operated so as to restrain the excessive increase of the amplitude in a buffering manner. Particularly, since the displacement defining means is located far away from the drive shaft, the load received by the displacement defining means is relatively small. Accordingly, the pitching of the power unit can be effectively restrained by the displacement defining means, and there is less in transmission of vibration from the power unit to the compartment through the displacement defining means.

The above and other objects, features and advantages of the present invention will become apparent from the description of the preferred embodiments which will be described hereinafter in detail with reference to the accompanying drawings.

BRIEF DESCRIPTION OF THE DRAWINGS

The drawings show one embodiment of the present invention, wherein.

DESCRIPTION OF THE PREFERRED EMBODIMENTS

One embodiment of the present invention will be described with reference to the drawings.

Figure 1:
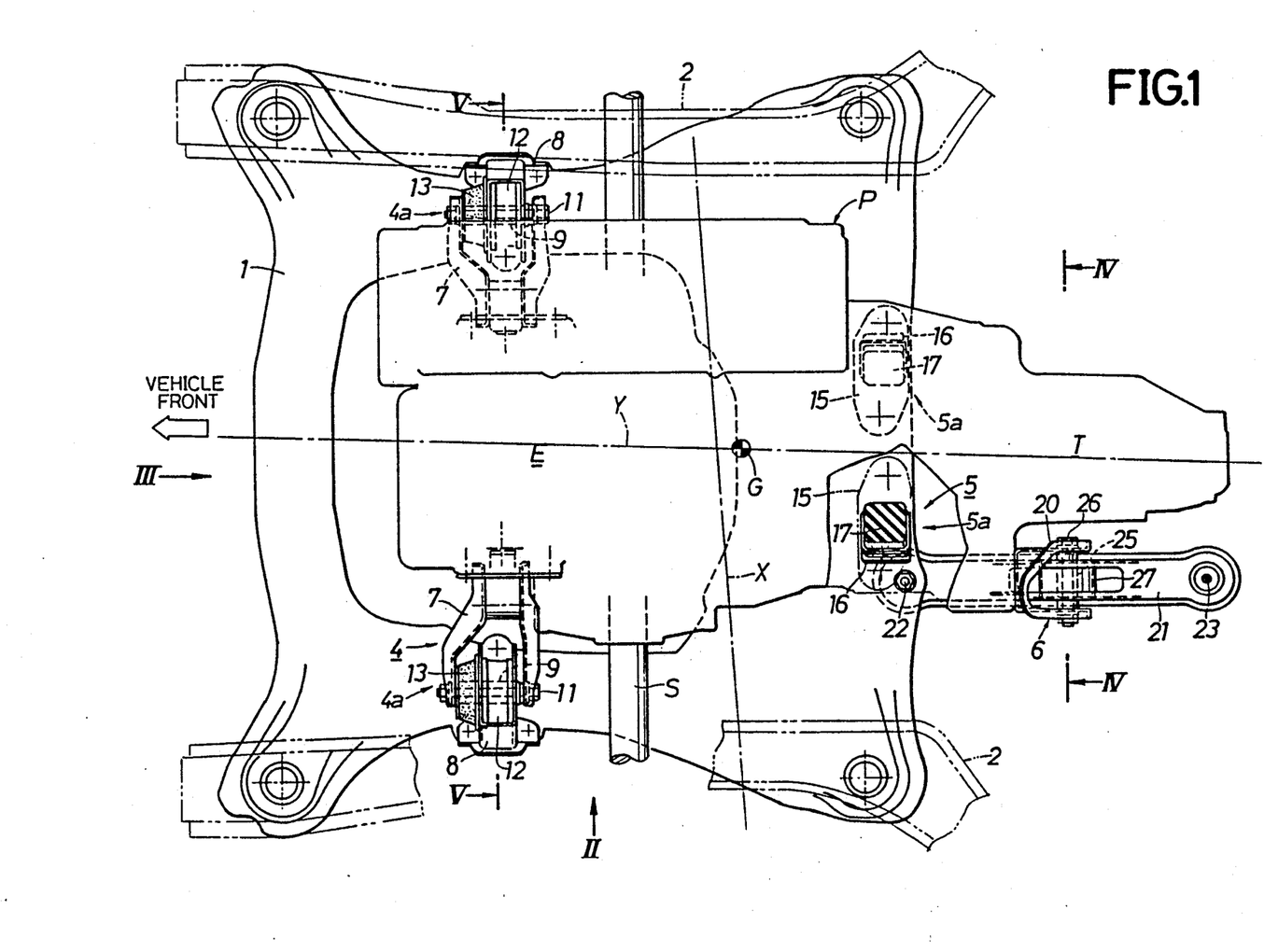
FIG. 1 is a plan view of a power unit supporting apparatus with partially cutaway.
Figure 2:
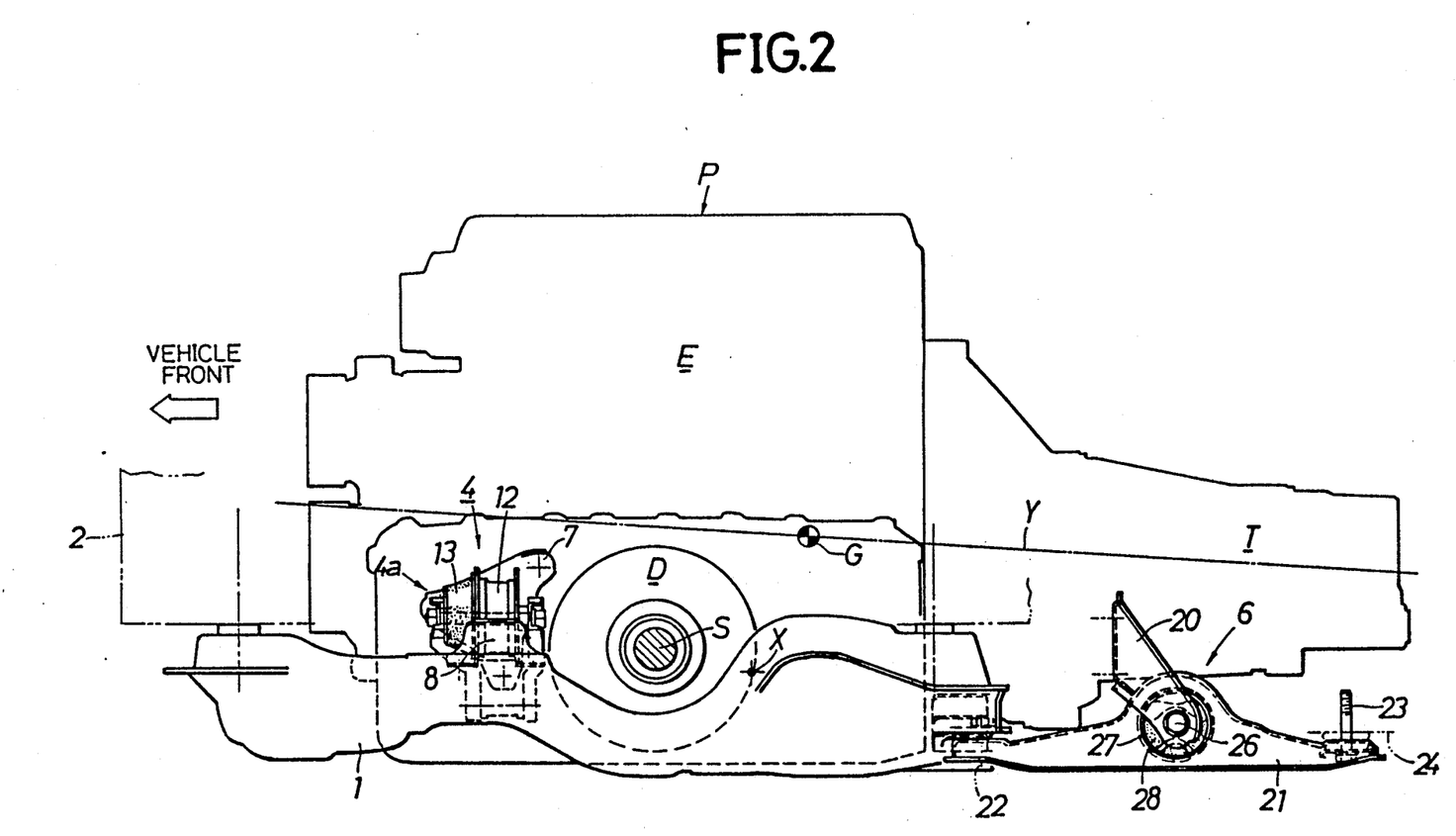
FIG. 2 is a view taken on line II of FIG. 1.
Figure 3:
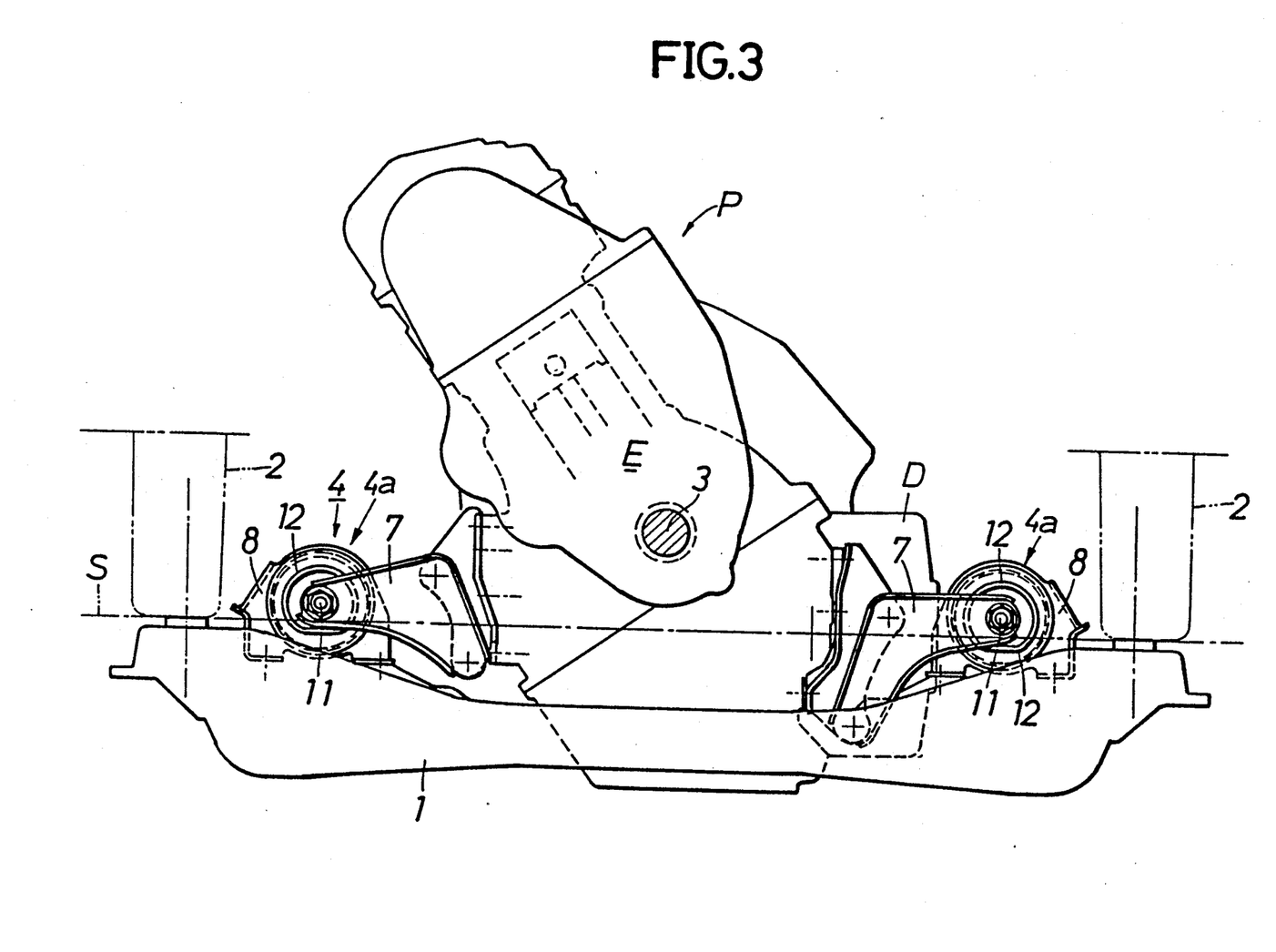
FIG. 3 is a view taken on line III of FIG. 1.

Referring first to FIGS. 1 to 3, a power unit P is for an FF (front engine and front drive) automobile, and is supported, in an engine room formed before a compartment of a vehicle, on a substantially square shaped sub-frame 1 which constitutes a part of a vehicle body. The sub-frame 1 is fixed at four corners thereof to front side frame portions 2 of the vehicle body through elastic members such as rubber.

The power unit P comprises an engine portion E in which a crankshaft 3 is arranged in a longitudinal direction of the vehicle body, a transmission portion T provided on the rear end of the engine portion E, a differential gear portion D provided on one side of a lower portion of the engine portion E, and a drive shaft S protruded from both left and right sides of the differential gear portion D and connected to left and right front wheels (not shown). A rear half portion of the transmission portion T is received in a tunnel portion formed on a floor plate of the compartment.

The power unit P is supported, on the sub-frame 1, at a front end of the power unit by first elastic support means 4 and at an intermediate portion, of the power unit, in the rear of the center of gravity G of the power unit by second elastic support means 5. A displacement defining means 6 which can resiliently restrain a vertical displacement of the transmission portion T in excess of a predetermined value is provided at the rear end of the power unit P, i.e., between the transmission portion T and the vehicle body in the illustrated example. The drive shaft S is arranged between the center of gravity G and the first elastic support means 4 as seen in a plan view.

Figure 5:
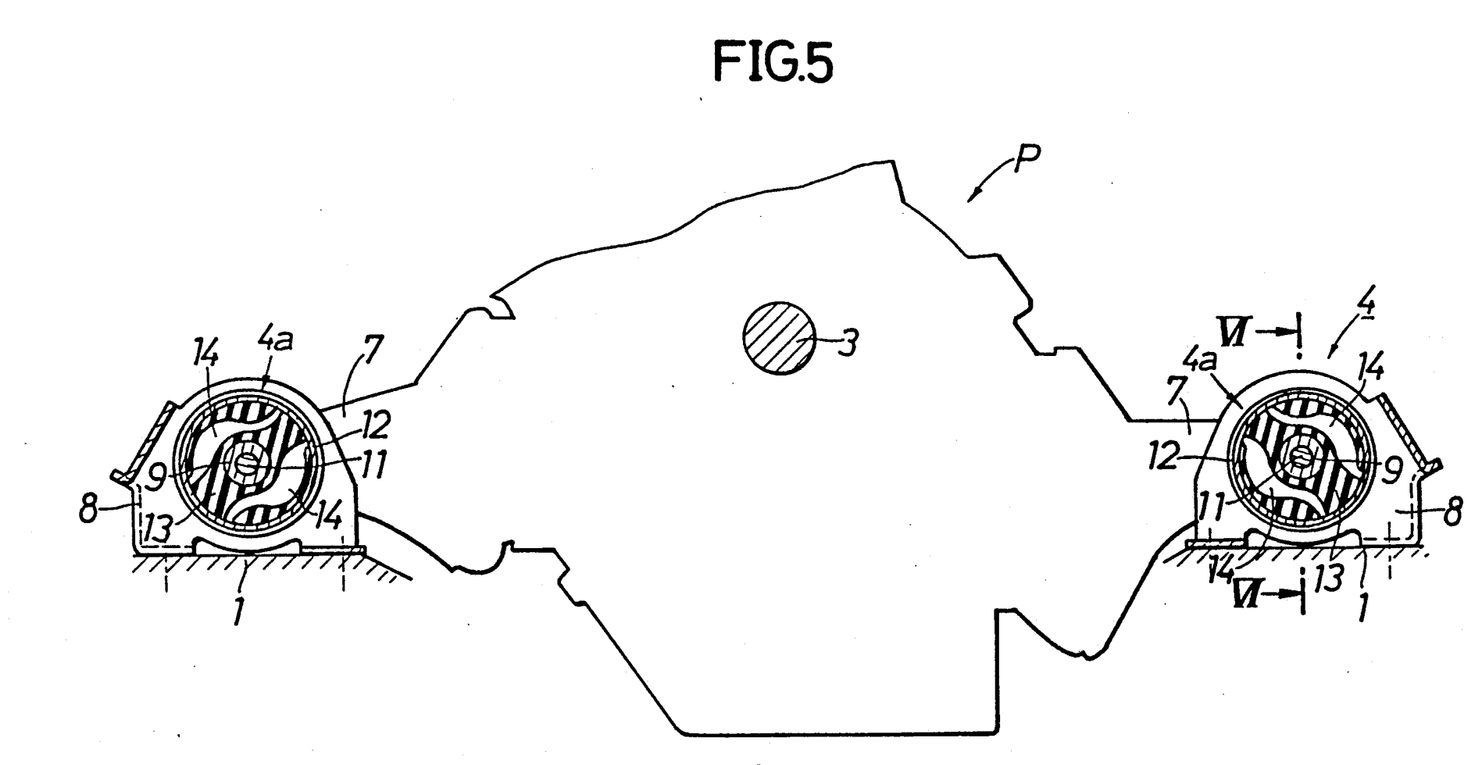
FIG. 5 is an enlarged sectional view taken on line V—V of FIG. 1.
Figure 6:
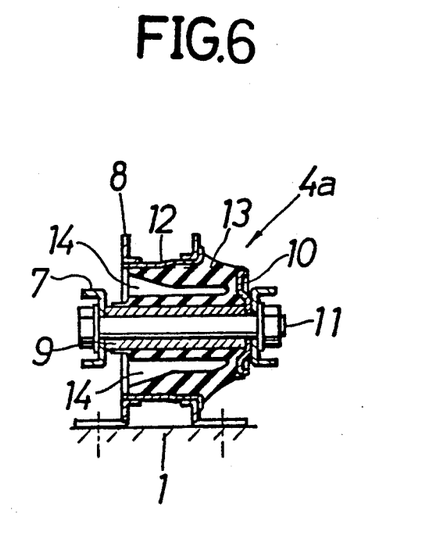
FIG. 6 is a sectional view taken on line VI - VI of FIG. 5.

As shown in FIGS. 3, 5 and 6, the first elastic support means 4 is comprised of a pair of left and right elastic support units 4a and 4a. Each of the elastic support units 4a comprises a bifurcated bracket 7 protruded on one side surface of the front end of the power unit P, and an annular bracket 8 protruded on the upper surface of the sub-frame 1 and disposed within the bifurcated portion of the bracket 7. On the bifurcated bracket 7 are fixedly mounted by bolts 11 an inner cylinder 9 extended through the annular bracket 8 and an end plate 10 adjacent to the front end of the inner cylinder 9. On the annular bracket 8 is fixedly mounted an outer cylinder 12 which concentrically surrounds the inner cylinder 9. An elastic body 13 made of rubber is baked over these inner and outer cylinders 9 and 12 and the end plate 10.

This elastic body 13 is provided with a pair of eyebrow-shaped concave portions 14 and 14 which open to the end surface opposite to the end plate 10 (see FIG. 5). The concave portions 14 and 14 hold the inner cylinder 9 therebetween and are incliningly arranged so as to be closer to the power unit P as heading upward. Each the eyebrow-shaped concave portions 14 is formed so that a width thereof is narrowest on a vertical line passing through the center of the inner cylinder 9 and is widest at a central portion of the concave portion 14. With this, the overall spring constants of the left and right elastic bodies 13 and 13 in the range of the concave portion 14 not being deformed are set to be relatively large in a vertical direction of the power unit P, relatively small in a rolling direction and largest in a longitudinal direction of the power unit P.

Figure 4:
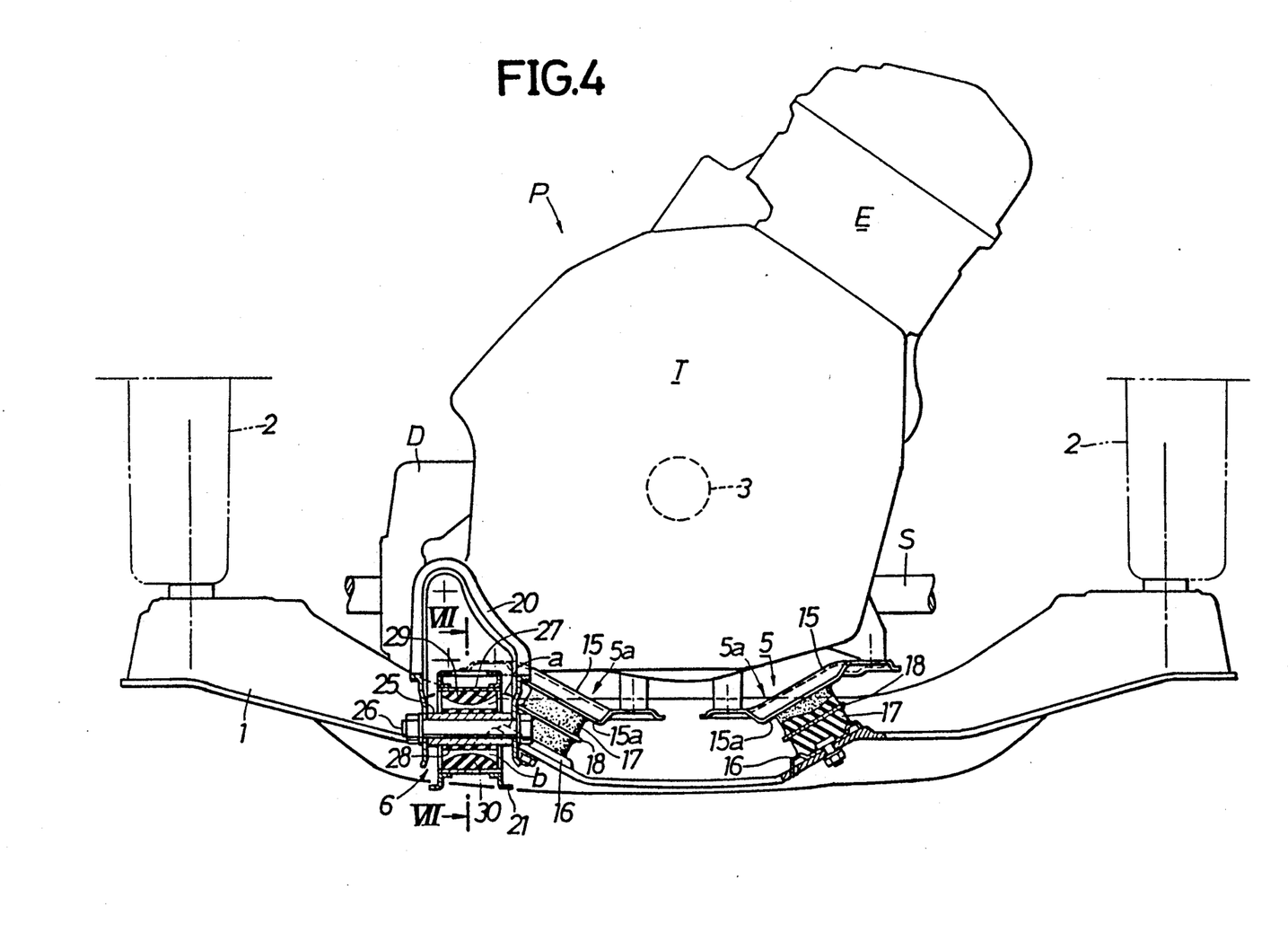
FIG. 4 is a sectional view taken on line IV—IV of FIG. 1.

As shown in FIGS. 1 and 4, the second elastic support means 5 is composed of a pair of left and right elastic support units 5a and 5a. Each of the elastic support units 5a comprises an upper bracket 15 secured to the bottom surface of the intermediate portion of the power unit P and a lower bracket 16 opposed to the upper bracket 15 and secured to the upper surface of the sub-frame 1. The upper bracket 15 has a bevel portion 15a which descends toward the center of the vehicle body. A prism elastic body 17 made of rubber is baked between the bevel portion 15a and the lower bracket 16 parallel therewith. With this, the overall spring constants of the left and right elastic bodies 17 and 17 are set to be relatively large in the vertical direction of the power unit P and relatively small in the rolling direction.

Embedded in each elastic body 17 is a shape-retaining plate 18 parallel with the bevel portion 15a to prevent buckling.

In the foregoing, in the first and second elastic support means 4 and 5, four elastic support units 4a, 4a, 5a and 5a are arranged so as to surround the center of gravity G of the power unit P. Further, the second elastic support means 5 is arranged closer than the first elastic support means 4 to the center of gravity G of the power unit P so that the weight distribution of the power unit P is larger in the second elastic support means 5 than the first elastic support means 4.

Figure 7:
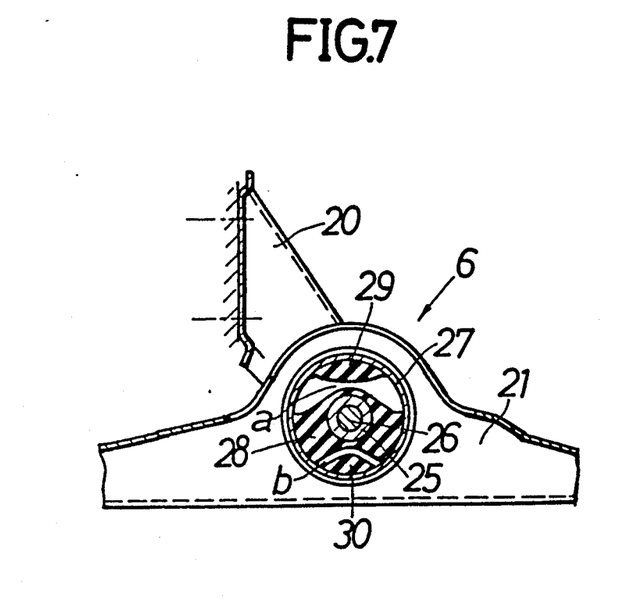
FIG. 7 is a sectional view taken on line VII—VII of FIG. 4.

As shown in FIGS. 2, 4 and 7, the aforementioned displacement defining means 6 comprises an upper bifurcated bracket 20 secured to one side of the transmission portion T and a lower bracket 21 passing through the bifurcated portions of the upper bracket 20 and extended in the longitudinal direction, the lower bracket 21 having a front end secured to the sub-frame 1 by means of a bolt 22 and a rear end secured to a floor portion 24 of the vehicle body by means of a bolt 23.

An inner cylinder 25 which connects between the bifurcated portions of the upper bracket 20 and extends in the lateral direction of the vehicle body is secured to the upper bracket 20 by means of a bolt 26. An outer cylinder 27 which concentrically surrounds the inner cylinder 25 is fitted to the lower bracket 21. A bent plate-like elastic body 28 made of rubber and raised at a middle portion thereof is baked between the inner and outer cylinders 25 and 27. The spring constant of the elastic body 28 in the vertical direction of the power unit P is set to be much smaller than those of the aforementioned elastic bodies 13 and 17 in the same direction.

Baked to the outer cylinder 27 are a pair of upper and lower elastic stoppers 29 and 30 opposed to the central portion of the elastic body 28 leaving predetermined gaps a and b. The spacing of the gaps a and b varies along the axis of the inner cylinder such that the spacing is large near the opposed ends of the elastic body 28 and small near the central portion of elastic body 28. Accordingly, the central portion of the elastic body 28 comes into contact with the elastic stoppers 29 and 30 whereby the upward and downward displacements of the transmission portion T are resiliently restrained.

Preferred examples of spring constants of the elastic bodies 13, 17 and 28 are given below.

|  | Vertical | Lateral | Longitudinal |
| --- | --- | --- | --- |
| Elastic body 13 (two) | 38 kgf/mm | 38 kgf/mm | 70 kgf/mm |
| Elastic body 17 (two) | 40 kgf/mm | 22 kgf/mm | 12 kgf/mm |
| Elastic body 28 | 20 kgf/mm | 7 kgf/mm | 25 kgf/mm |

The operation of this embodiment will be described hereinafter.

During idling, the power unit P vibrates around the rolling axis Y due to a rotational variation of the crankshaft 3. Since the spring constants of the elastic bodies 13 and 17 of the first and second elastic support means 4 and 5 are relatively small, these elastic bodies 13 and 17 can be easily deformed to well absorb the vibration.

On the other hand, since the elastic body 28 of the displacement defining means 6 is very small in spring constant in the vertical and lateral directions, the elastic body 28 is very easily deformed in the range not in contact with the elastic stoppers 29 and 30 to allow the aforesaid rolling vibration with little resistance. Accordingly, even if the displacement defining means 6 comes close to the compartment, there hardly occurs vibration which is transmitted from the power unit P to the compartment through the means 6.

The power unit P vibrates around the pitching axis X due to the drive reaction of the drive shaft S during low and medium load operations. This vibration acts as the vertical vibration on the elastic bodies 13 and 17 of the first and second elastic support means 4 and 5. The spring constant of each of the elastic bodies 13 and 17 is relatively large in that vertical direction. Therefore, each of the elastic bodies 13 and 17 exhibits reliable proof against floating up of the power unit P to restrain the amplitude thereof to a small level. Moreover, in the stage where the pitching amplitude of the power unit P is small, the elastic body 28 of the displacement defining means 6 does not contact with the elastic stoppers 29 and 30. Therefore, in this case also, there hardly occurs vibration which is transmitted from the power unit P to the compartment through the means 6.

In the displacement defining means 6, when the pitching amplitude of the power unit P exceeds a predetermined value during a high load operation, the central portion of the elastic body 28 comes into contact with the elastic stopper 29 or 30 whereby an excessive increase of the amplitude is restrained without being accompanied by shocks. Moreover, since the displacement defining means 6 is located far away from the drive shaft S, the load applied to the elastic stopper 29 or 30 is relatively small. The increase in the pitching amplitude of the power unit P can be effectively restrained while relieving a burden of the elastic stoppers 29 and 30, and the transmission of vibration from the power unit P to the compartment through the displacement defining means 6 can be reduced.

The whole power unit P vibrates vertically during traveling on a bad or rough road. The spring constant of each of the elastic bodies 13 and 17 of the first and second elastic support means 4 and 5 is relatively large in that vertical direction, and thereby the vertical amplitude of the power unit P is restrained to a small level. Since in the displacement defining means 6, the central portion of the elastic body 28 is easily deformed in the range not in contact with the elastic stoppers 29 and 30, there hardly occurs transmission of vibration to the compartment.

Since the center of gravity G of the power unit P is positioned at the rear of the drive shaft S, the power unit P is of a so-called midship type, contributing to an improvement in performance of motion of the vehicle.

Figure 8:
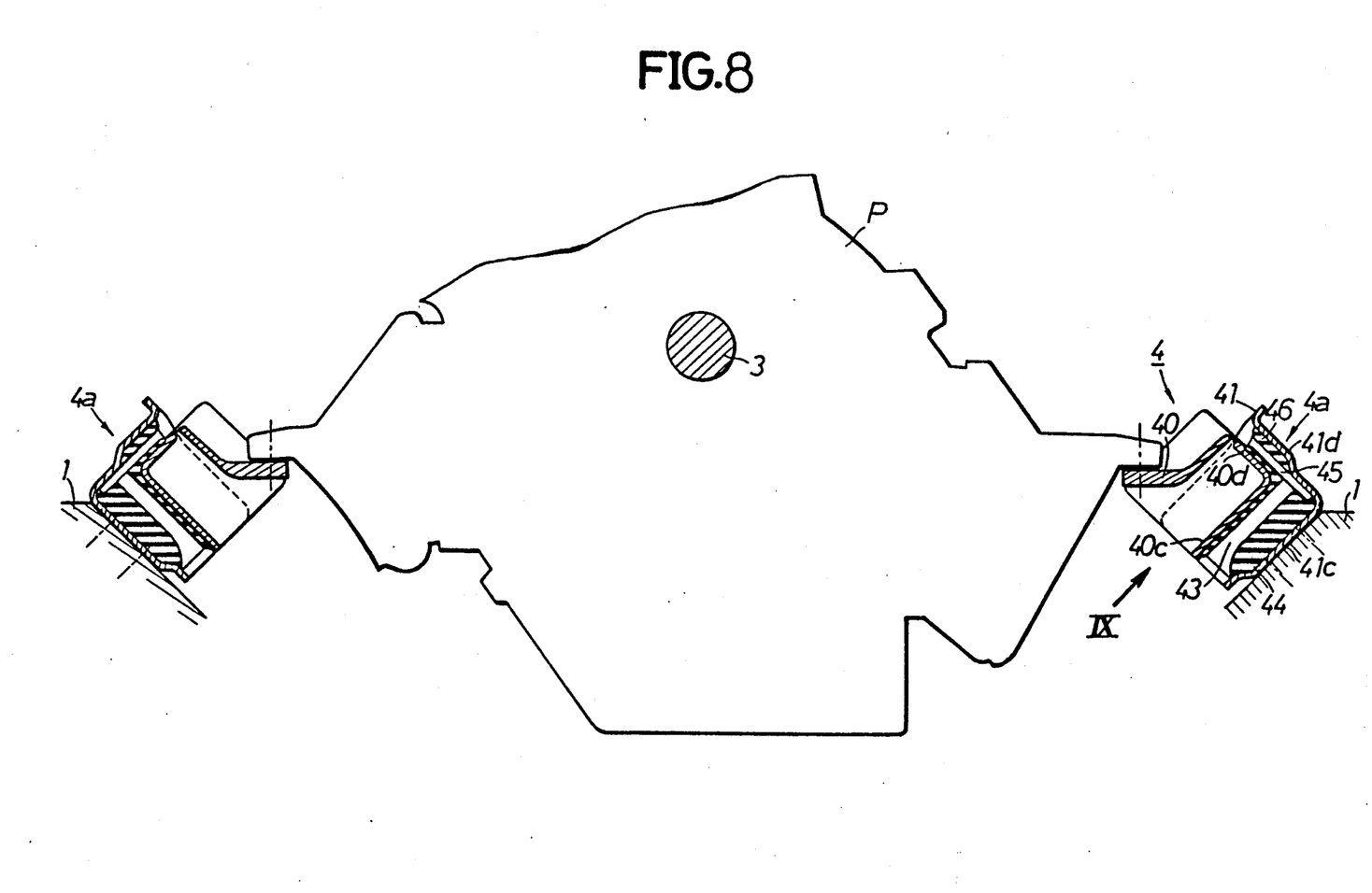
FIG. 8 is a sectional view similar to FIG. 5 showing a modified form of first elastic support means.
Figure 9:
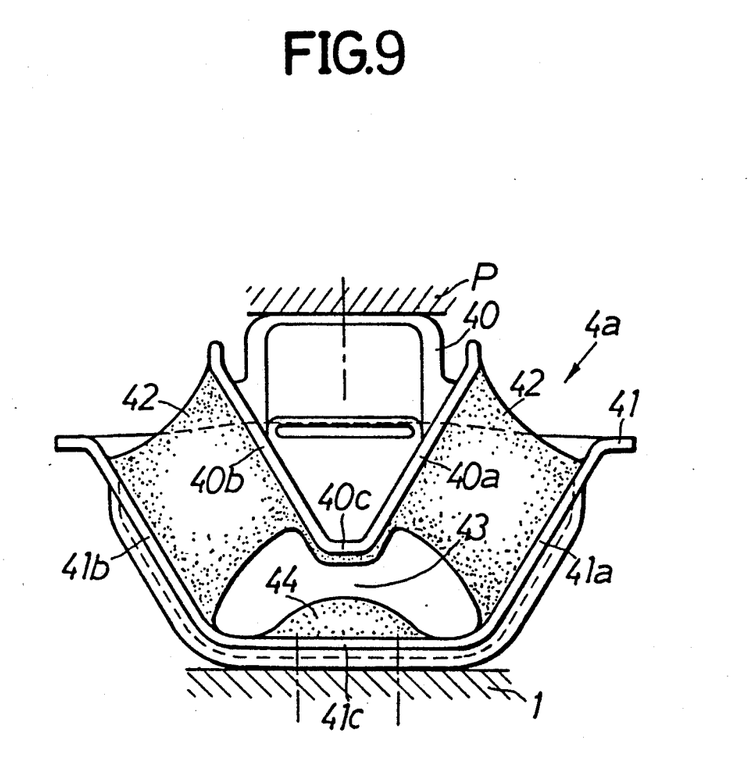
FIG. 9 is a view seen in a direction of arrow IX of FIG. 8.

FIGS. 8 and 9 show a modified form of the first elastic support means 4. In this case, the first elastic support means 4 is also composed of a pair of left and right elastic support units 4a and 4a. Each elastic support unit 4a comprises an inner bracket 40 secured to one side of the front end of the power unit P and an outer bracket 41 secured to the upper surface of the sub-frame 1 and arranged so as to hold the inner bracket 40.

The inner bracket 40 has front and rear walls 40a and 40b opened in the form of V. The inner bracket 40 is arranged so that a ridge line portion 40c between both the walls 40a and 40b descends toward the center of the vehicle body. Both the walls 40a and 40b are connected together at their upper ends by a connecting wall 40d.

On the other hand, the outer bracket 41 is formed into a groove form in which a portion opposed to the ridge line portion 40c is a bottom wall 41c, and front and rear walls 41a and 41b thereof are arranged parallel with the front and rear walls 40a and 40b of the inner bracket 40. Both the walls 41a and 41b are also connected at upper ends thereof by a connecting wall 41d. This connecting wall 41d is arranged to be opposed to the connecting wall 40d at an upper portion thereof.

Elastic bodies 42 and 42 are baked between the opposed front walls 40a and 41a and between the rear walls 40b and 41b, respectively. Baked on the outer bracket 41 is a first elastic stopper 44 opposed to the ridge line portion 40c of the inner bracket 40 leaving a predetermined gap 43. Also, baked on the connecting wall 41d of the outer bracket 41 is a second elastic stopper 46 opposed to the connecting wall 40d of the inner bracket 40 leaving a predetermined gap 45.

In the above described construction of the elastic support unit 4a, the elastic bodies 42 and 42 and the elastic stoppers 44 and 46 can be molded once for all by pattern draw molding only in two directions.

The first elastic stopper 44 carries the ridge line portion 40c of the inner bracket 40 to restrict a downward displacement of the power unit P a value more than a predetermined level, and the second elastic stopper 46 carries the connecting wall 40d of the inner bracket 40 to restruct a displacement of the power unit P of a value more than a predetermined level in the rolling direction, upward and lateral directions. The overall spring constants of the left and right elastic support units 4a and 4a in the range wherein both the elastic stoppers 44 and 46 are not operated are the same as those shown in the previous embodiment.

In the above-described embodiment, although the first and second elastic support means 4 and 5 are composed of the pair of left and right elastic support units 4a, 4a; 5a, 5b, respectively, it is to be noted that one of the elastic support means 4 or 5 can be composed of a single elastic support unit arranged on a longitudinal center line of the power unit P. Of course, each of the elastic support means 4 and 5 can be composed of three or more elastic support units. Furthermore, in the above-described embodiment, the displacement defining means 6 has been arranged below the side of the transmission T, it is to be noted that if an extra space is available, the means 6 can be arranged just below or just behind the transmission T.

Furthermore, the present invention can be applied also to an RR (rear engine and rear drive) type automobile, in which case, the displacement defining means 6, the second elastic support means 5 and the first elastic support means are arranged in this order from the front.

What is claimed is:

1. A power unit supporting apparatus for an automobile for supporting a power unit on a vehicle body, the power unit comprising an engine portion having a crankshaft arranged in a longitudinal direction of the vehicle body, a transmission portion disposed at a first end of the engine portion aligned along a longitudinal direction of the vehicle body, and a drive shaft disposed below the engine portion and which extends in a lateral direction of the vehicle body for driving wheels, said apparatus comprising:

first elastic support means connected to the vehicle body for elastically supporting a first end of said power unit, said first end of said power unit being distal from a passenger compartment of the automobile;

second elastic support means connected to the vehicle body for elastically supporting an intermediate portion of said power unit, said second elastic support means being located on an opposite side of the center of gravity of said power unit from said first end of said power unit; and displacement defining means connected between the vehicle body and a second end of said power unit proximal to the passenger compartment of the automobile, for resiliently restraining a vertical displacement of said second end to be within a predetermined range, wherein said first and second elastic support means have respective spring constants which are relatively large in a vertical direction of displacement of said power unit and which are relatively small in a rolling direction of displacement of said power unit.

2. The power unit supporting apparatus for an automobile according to claim 1, wherein the second elastic support means is disposed closer than the first elastic support means to the center of gravity of said power unit.

3. The power unit supporting apparatus for an automobile according to claim 1 or 2, wherein said power unit is for a front engine and front drive automobile, and wherein said drive shaft is disposed so that its drive axis lies in a plane which crosses between said first elastic support means and the center of gravity of said power unit.

4. The power unit supporting apparatus according to claim 1, wherein said first elastic support means comprises a first pair of elastic support units, each of said first pair of elastic support units comprising a first outer cylinder, a first inner cylinder, and a first elastic body connecting said inner cylinder and said outer cylinder.

5. The power unit supporting apparatus according to claim 4, wherein each of said first pair of elastic support units additionally comprises bracket means for connecting said power unit to said inner cylinder.

6. The power unit supporting apparatus according to claim 4, wherein said elastic body includes a first portion encasing said inner cylinder, a second portion which is adjacent said outer cylinder and which is spaced from said first portion, and a third portion which is adjacent said outer cylinder and which is spaced from said first portion; whereby said second and third portions limit displacement of said first portion relative to said outer cylinder.

7. The power unit supporting apparatus according to claim 6, wherein the spacing between said first portion of said elastic body and said second portion of said elastic body varies in a direction transverse to the axis of said inner cylinder such that the spacing is relatively large in the vicinity of said first portion and is relatively small in the vicinity of said outer cylinder.

8. The power unit supporting apparatus according to claim 1, wherein said displacement defining means comprises a displacement limiting elastic support unit, said displacement limiting elastic support unit comprising a support unit outer cylinder, a support unit inner cylinder, and a support unit elastic body connecting said support unit inner cylinder and said support unit outer cylinder.

9. The power unit supporting apparatus according to claim 8, wherein said displacement limiting elastic support unit additionally comprises bracket means for connecting said power unit to said inner cylinder.

10. The power unit supporting apparatus according to claim 8, wherein said elastic support unit includes a first portion encasing said support unit inner cylinder, a second portion which is adjacent an upper region of said support unit outer cylinder and which is spaced from said first portion of said support unit inner cylinder, and a third portion which is adjacent a lower region of said support unit outer cylinder and which is spaced from said first portion of said support unit inner cylinder, whereby said second and third portions of said support unit elastic body limit displacement of said first portion relative to said outer cylinder.

11. The power unit supporting apparatus according to claim 10, wherein the spacing between said first portion and said second portion of said support unit elastic body varies in a direction parallel to the axis of said inner cylinder such that the spacing is relatively large in the vicinity of opposed ends of said first portion and is relatively small in the vicinity of a central region of said first portion.

12. The power unit supporting apparatus according to claim 10, wherein the spacing between said first portion and said third portion of said support unit elastic body varies in a direction parallel to the axis of said inner cylinder such that the spacing is relatively large in the vicinity of opposed ends of said first portion and is relatively small in the vicinity of a central region of said first portion.

13. The power unit supporting apparatus according to claim 11, wherein a predetermined minimum spacing exists between said second portion and said first portion of said support unit elastic body.

14. The power unit supporting apparatus according to claim 12, wherein a selected minimum spacing exists between said third portion and said first portion of said support unit elastic body.

* * * * *